United States Patent
Gupta et al.

(10) Patent No.: US 10,360,582 B2
(45) Date of Patent: Jul. 23, 2019

(54) SOCIAL COMMERCE RETURN ON INVESTMENT

(71) Applicant: Dell Products L.P., Round Rock, TX (US)

(72) Inventors: Munish Gupta, Austin, TX (US); Rajiv Narang, Cupertino, CA (US); Akintunde A. Ehindero, Atlanta, GA (US); Jennifer W. Bruce, Pflugerville, TX (US); Ahmed Tariq, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 727 days.

(21) Appl. No.: 13/737,492

(22) Filed: Jan. 9, 2013

(65) Prior Publication Data

US 2014/0195333 A1 Jul. 10, 2014

(51) Int. Cl.
G06Q 30/02 (2012.01)
G06Q 50/00 (2012.01)
G06Q 30/00 (2012.01)

(52) U.S. Cl.
CPC ......... G06Q 30/0244 (2013.01); G06Q 50/01 (2013.01)

(58) Field of Classification Search
CPC ........... G06Q 30/0242; G06Q 30/0201; G06Q 50/01; H04L 67/22
USPC .................................................. 709/204, 224
See application file for complete search history.

(56) References Cited

U.S. PATENT DOCUMENTS

| 7,068,775 | B1* | 6/2006 | Lee ............... | H04M 3/428 379/265.02 |
| 8,291,016 | B1* | 10/2012 | Whitney ........ | G06Q 30/0201 709/204 |
| 2003/0135490 | A1* | 7/2003 | Barrett ........... | G06F 16/9535 |
| 2003/0163427 | A1* | 8/2003 | Fung ............... | G06Q 30/02 705/51 |
| 2004/0030592 | A1* | 2/2004 | Buck ............... | G06Q 10/06 705/7.31 |
| 2009/0227374 | A1* | 9/2009 | Tirpak ............. | A63F 13/12 463/40 |
| 2010/0198742 | A1* | 8/2010 | Chang ............. | G06Q 10/00 705/319 |
| 2010/0223578 | A1* | 9/2010 | Huberman ...... | G06Q 99/00 715/810 |

(Continued)

*Primary Examiner* — Matthew T Sittner
(74) *Attorney, Agent, or Firm* — Terrile, Cannatti & Chambers; Stephen A. Terrile

(57) ABSTRACT

A system and method are disclosed for analyzing return on investment (ROI) for social commerce interactions. User data associated with a target group of social media users is collected and processed to generate a first set of social commerce metrics. The user data comprises a first set of social media interaction data corresponding to a first set of social commerce interactions with the target group of social media users. The user data is further processed to generate a second set of social commerce interactions, which are then performed. The performance of the second set of social commerce interactions generates a second set of social commerce interaction data, which in turn is processed to generate a second set of social commerce metrics. The first and second sets of social commerce metrics are then processed to generate social commerce ROI metrics.

19 Claims, 9 Drawing Sheets

(56) References Cited

U.S. PATENT DOCUMENTS

| | | | | |
|---|---|---|---|---|
| 2010/0312724 | A1* | 12/2010 | Pinckney | G06Q 30/02 |
| | | | | 706/11 |
| 2011/0010384 | A1* | 1/2011 | Luo | G06Q 10/10 |
| | | | | 707/769 |
| 2011/0040760 | A1* | 2/2011 | Fleischman | G06Q 30/02 |
| | | | | 707/737 |
| 2012/0174157 | A1* | 7/2012 | Stinson, III | H04N 5/44543 |
| | | | | 725/40 |
| 2013/0035982 | A1* | 2/2013 | Zhang | G06Q 30/02 |
| | | | | 705/7.29 |
| 2013/0166379 | A1* | 6/2013 | Ehindero | G06Q 30/02 |
| | | | | 705/14.52 |
| 2014/0052732 | A1* | 2/2014 | Softky | G06F 16/328 |
| | | | | 707/741 |
| 2014/0195333 | A1* | 7/2014 | Gupta | G06Q 30/0244 |
| | | | | 705/14.43 |

* cited by examiner

SOCIAL COMMERCE RETURN ON INVESTMENT

BACKGROUND OF THE INVENTION

Field of the Invention

Embodiments of the invention relate generally to information handling systems. More specifically, embodiments of the invention provide a system and method for analyzing return on investment (ROI) for social commerce interactions.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years, information handling systems have also been instrumental in the widespread adoption of social media into the mainstream of everyday life. Social media commonly refers to the use of web-based technologies for the creation and exchange of user-generated content for social interaction. As such, it currently accounts for approximately 22% of all time spent on the Internet. More recently, various aspects of social media have become an increasingly popular means for enabling customer feedback, and by extension, it has likewise evolved into a viable sales and marketing channel for vendors. This new channel, sometimes referred to as "social commerce," has proven to not only have a higher customer retention rate than traditional channels, but to also provide higher demand generation "lift."

Other aspects of social commerce include campaign management and sales lead nurturing, which allows organizations and marketers to target populations of social media users that exhibit the same, or similar, set of characteristics. Interactions with individuals within these segments are then specified to increase the likelihood of a positive outcome, such as making a purchase. Such interactions may be a single point of contact or a series of contacts across one or more mediums over a period of time. While social commerce marketing campaigns and sales lead nurturing efforts are generally acknowledged as being strategically crucial, their return on investment (ROI) is equally recognized as being difficult to quantify.

SUMMARY OF THE INVENTION

A system and method are disclosed for analyzing return on investment (ROI) for social commerce interactions. In various embodiments, social media and other data is collected, processed, and analyzed to determine a vendor's return on investment (ROI) for activities, operations, and processes related to promoting and selling their products or services in social commerce environments.

In these various embodiments, user data associated with a target group of social media users is collected and then processed to generate a first set of social commerce metrics. In one embodiment, the user data comprises a first set of social media interaction data corresponding to a first set of social commerce interactions with the target group of social media users. In this embodiment, the user data is processed with the first set of social media interaction data to generate a second set of social commerce interactions, which are then performed by the vendor. The performance of the second set of social commerce interactions generates a second set of social commerce interaction data, which in turn is processed to generate a second set of social commerce metrics. The first and second sets of social commerce metrics are then processed to generate social commerce ROI metrics.

In various embodiments, the second set of social media interactions may comprise, automated marketing operations, sales lead nurturing operations, or sales execution processes. In one embodiment, the user data is processed to generate a social presence map and the first set of social media interaction data is processed to generate a predictive model. In this embodiment, the social presence map and the predictive model are processed to generate the first set of social commerce metrics. In one embodiment, the social presence map and the predictive model are further processed to identify triggers to initiate the second set of social commerce interactions. In one embodiment, the predictive model is used to generate the sales leads that are nurtured in the sales lead nurturing operations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method is disclosed for analyzing return on investment (ROI) for social commerce interactions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
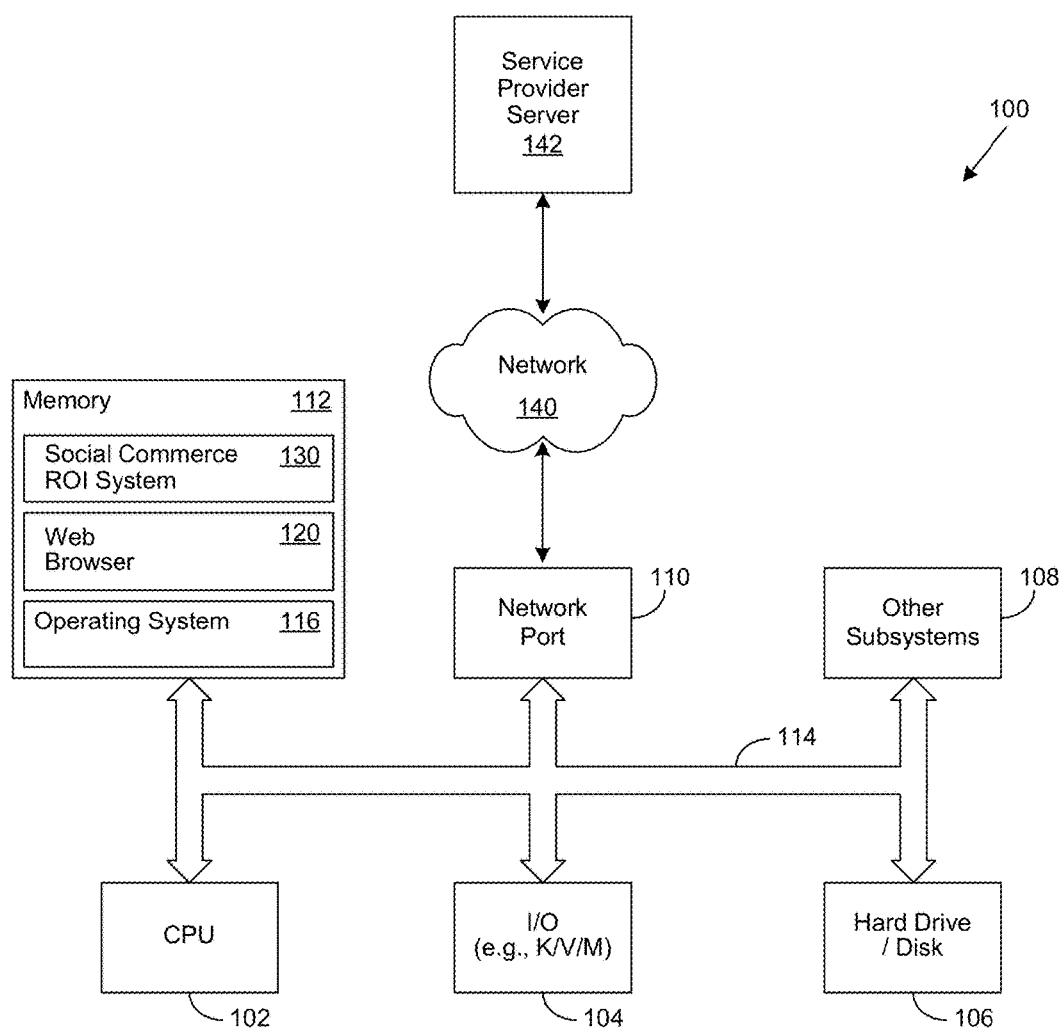
FIG. 1 is a generalized illustration of the components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and a Web browser 120. In various embodiments, the system memory 112 may also comprise a social commerce return on investment (ROI) system 130. In one embodiment, the information handling system 100 is able to download the Web browser 120 and the social commerce ROI system 130 from the service provider server 142. In another embodiment, the social commerce ROI system 130 is provided as a service from the service provider server 142.

In various embodiments, the social targeting system 120 is used to identify social media users that exhibit an intent to purchase a product or solution by analyzing their social footprint, online behavior, past purchase activity, and other interactions with a target vendor. For example, a customer may not have purchased a server-type information handling system in a certain amount of time (e.g., 20 months), thereby indicating a purchase history. However, the same customer may have been researching server-type information handling systems in an online community for another certain amount of time (e.g., a few weeks), thereby indicating their intent to purchase. As a result, the customer can be identified as a high priority account with an intent to purchase server-type information handling systems in the near future. This information is then provided to a sales organization as a potential sales lead.

Figure 2:
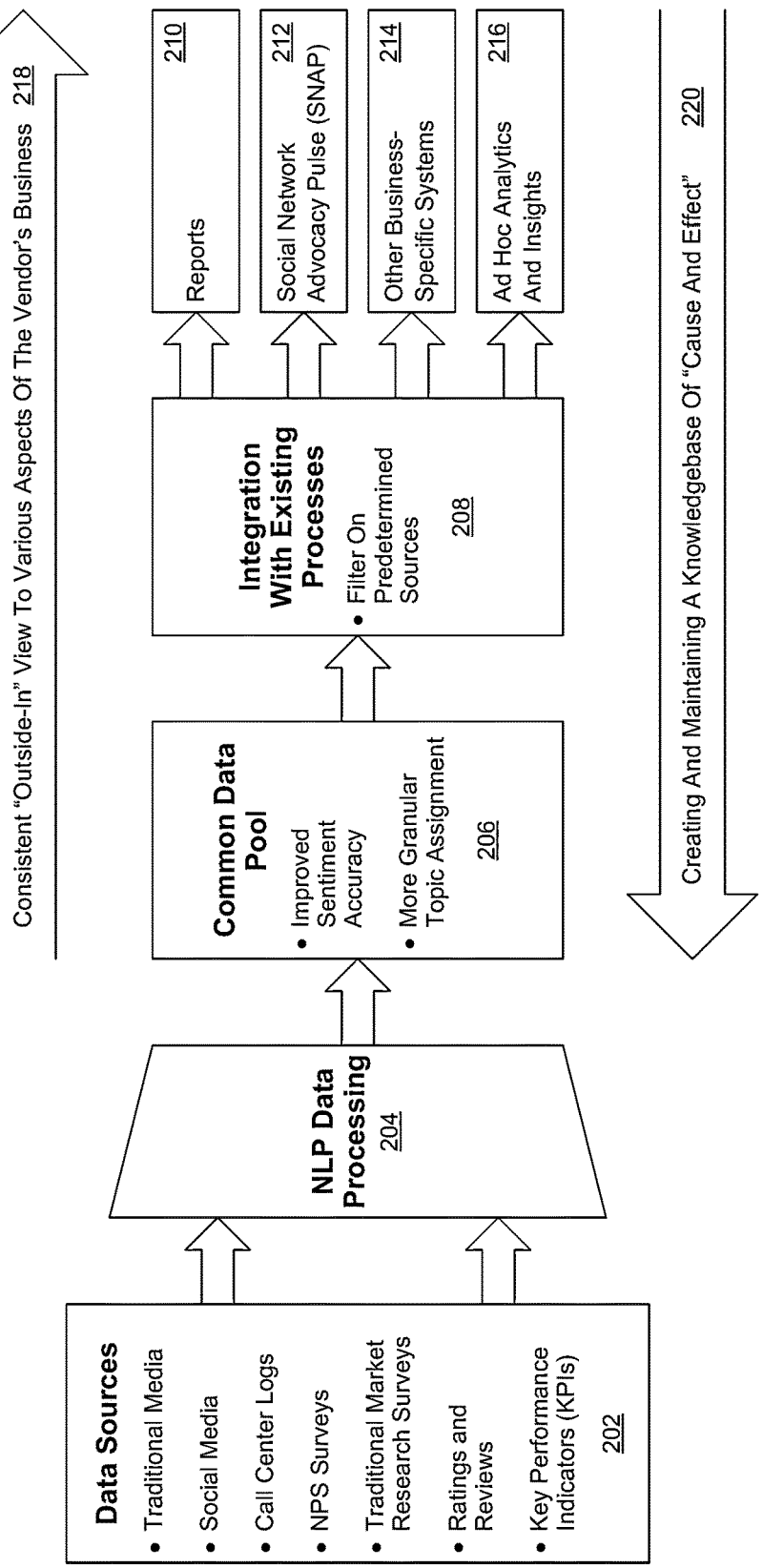
FIG. 2 shows a block diagram of data monitoring and analysis operations.

FIG. 2 shows a block diagram of data monitoring and analysis operations implemented in accordance with an embodiment of the invention. In various embodiments, social media and other data is collected, processed, and analyzed to determine a vendor's return on investment (ROI) for activities, operations, and processes related to promoting and selling their products or services in social commerce environments. In this embodiment, a plurality of data sources 202 are processed using natural language processing (NLP) data processing 204 operations familiar to those of skill in the art to generate a common data pool 206. In various embodiments, the data sources 202 may comprise data associated with traditional media (e.g., print, broadcast, etc.), social media, call center logs, net promoter scores (NPS) surveys, traditional market research surveys, ratings and reviews, and key performance indicators (KPIs). In various embodiments, the common pool data 206 comprises data associated with improved social media sentiment accuracy and more granular topic assignment.

As shown in FIG. 2, the common data pool is then provided for integration with existing processes 208, which filters the common pool data 206 on predetermined data sources 202. In turn, the existing processes generate various reports 210, social network advocacy pulse (SNAP) 212 metrics, and ad hoc analytics and insights 216. As used herein, SNAP refers to is a measure of the sentiment and advocacy for each dimension of the vendor's business, based upon the underlying social media interactions. In various embodiments, the integration with existing processes 208 may include integration with other business-specific systems 214. As a result, a consistent "outside-in" view to various aspects of a vendors business 218 is generated, concurrent with creating and maintaining a knowledge base of "cause and effect" 220.

Figure 3:
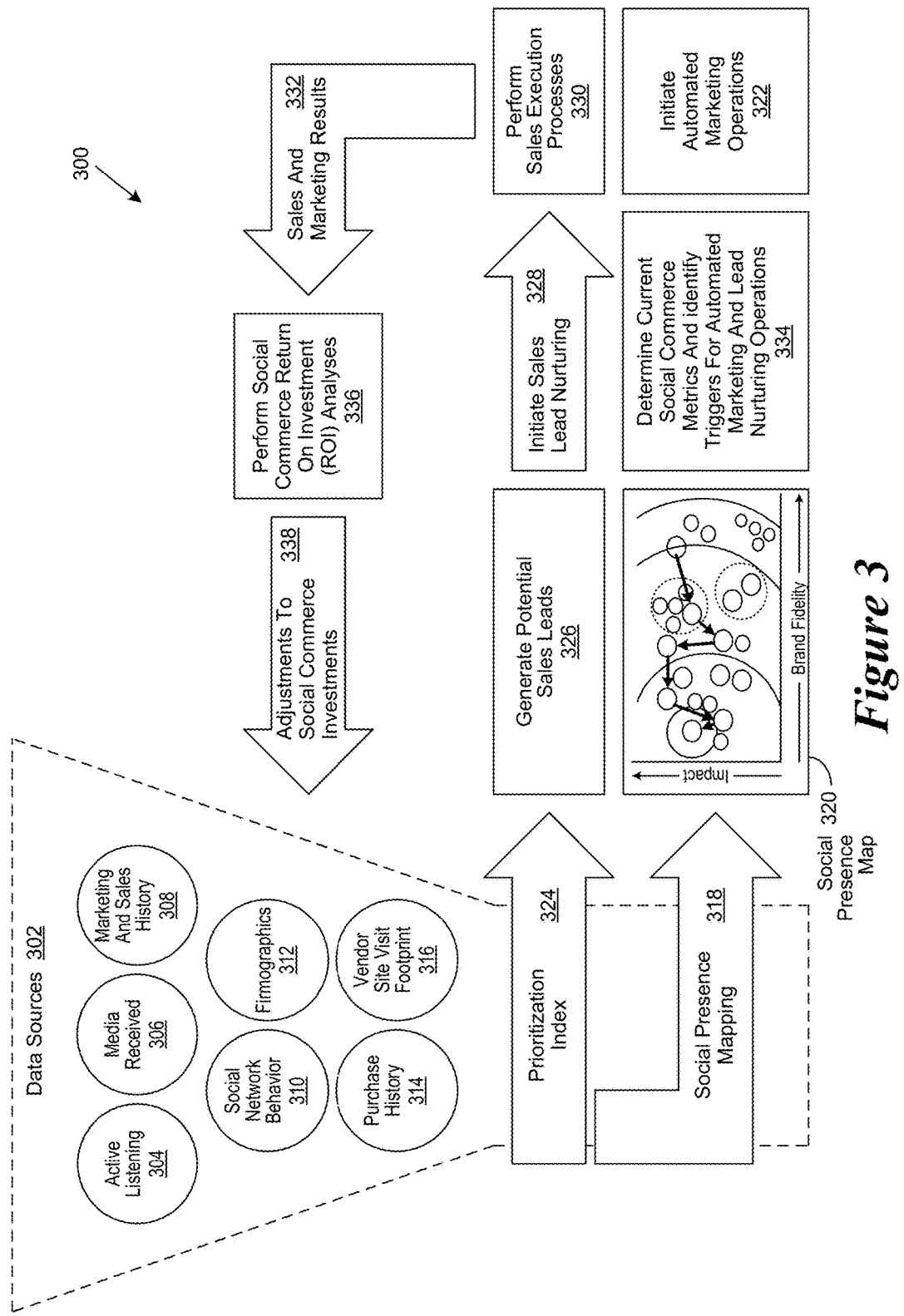
FIG. 3 shows a block diagram of a social commerce return on investment (ROI) system.

FIG. 3 shows a block diagram of a social commerce return on investment (ROI) system as implemented in accordance with an embodiment of the invention. In various embodiments, social media and other data 302 is collected, processed, and analyzed by the social commerce ROI system 300 to determine a vendor's ROI for activities, operations, and processes related to promoting and selling their products or services in social commerce environments. In this embodiment, data sources 302 comprise active listening 304 data, media received 306 data, marketing and sales history 308 data, social network behavior 310 data, firmographics 312 data, purchase history 314 data, and vendor site visit 316 data. As used herein, active listening 304 data refers to data that is collected by actively monitoring social media interactions between users of a social media environment, and media received 306 data broadly refers to data related to any media received by a user of a social media environment. As likewise used herein, marketing and sales history 308 data refers to data related to marketing efforts (e.g., campaigns, promotions, advertising, etc.) and resulting sales associated with one or more users of a social media environment. Likewise, as used herein, social network behavior 310 data broadly refers to data related to social media interactions performed by a user of a social media environment. Firmographics 312 data, as used herein, refers to data related to the characteristics (e.g., industry, revenue, number of employees, etc.) of an organization. As used herein, purchase history 314 data refers to data related to past purchases of goods and services by one or more users of a social media environment. As likewise used herein, vendor site visit footprint 316 data broadly refers to data related to visits made to a vendor's site by one or more users of a social media environment.

In this embodiment, social and other data associated with a target group of social media users is received from the data sources 302 and is then processed to generate a prioritization index 324 and to perform social presence mapping 318 operations. As described in greater detail herein, the prioritization index 324 is used to generate sales leads 326, which in turn are used in sales action and nurturing 328 operations to perform sales processes 330. As likewise described in greater detail, social presence mapping operations 318 described in greater detail herein to generate social presence maps 320 from the data sources 302.

The previously-generated prioritization index 324 and social presence maps are then used in operation 334 to determine current social commerce metrics and to identify triggers to respectively initiate automated marketing and sales lead nurturing operations in operations 322 and 328. The resulting nurtured sales leads are then used to perform sales execution processes familiar to those of skill in the art in operation 330. Social commerce ROI analysis operations, as described in greater detail, are the performed in operation 336 on the resulting marketing and sales results 332. In one embodiment, the ROI analysis operations are performed by comparing the sales and marketing results from operation 332 to the current social commerce metrics determined in operation 334. Appropriate adjustments to the vendor's investments in social commerce activities, operations, and processes are then made in operation 338. In various embodiments, these adjustments provide additional input to data sources 302.

Figure 4:
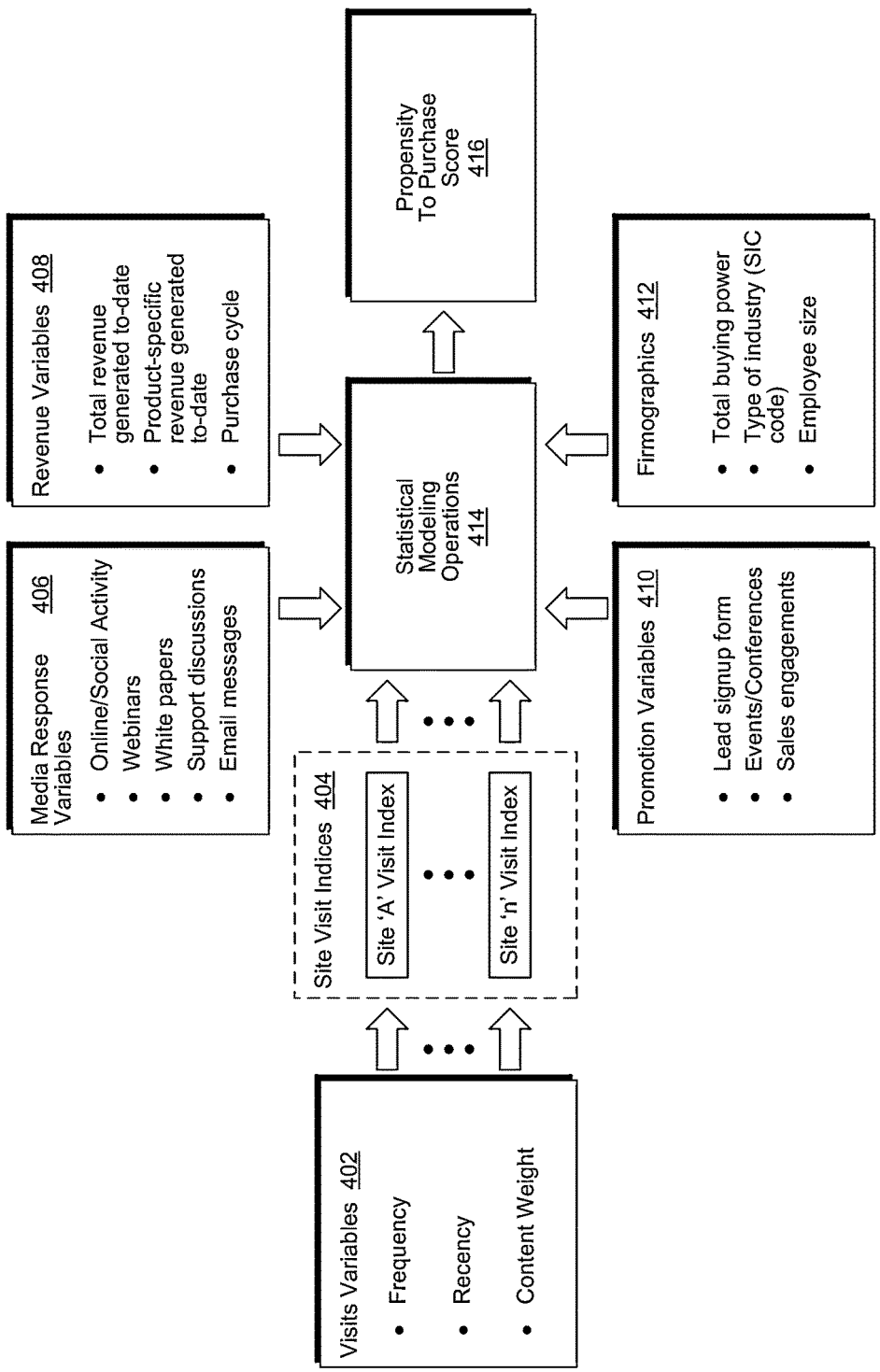
FIG. 4 shows a block diagram of the generation of a propensity-to-purchase score.

FIG. 4 shows a block diagram of the generation of a propensity-to-purchase score as implemented in accordance with an embodiment of the invention. In various embodiments, a propensity-to-purchase score 416 is generated for predetermined social media users and they are ranked accordingly. The ranked social media users are then converted into sales leads for nurturing. In one embodiment, the sales leads are processed to identify net new sales leads. In another embodiment, the sales leads are processed to identify current sales leads for various products or services, which are in turn ranked accordingly.

In certain embodiments, the propensity to purchase score is generated by performing statistical modeling operation 414 familiar to skilled practitioners of the art. In these and other embodiments, media response variables 406, revenue variables 408, promotion variables 410, firmographics 412, and site visit indices 404, described in greater detail herein, are used as inputs when performing the statistical modeling operations 414. As shown in FIG. 4, media response variables 406 may comprise responses to users' interaction with a variety of media, such as social and online activity, webinars, white papers, support discussions, email messages, and so forth. Likewise, revenue variables 408 may comprise the total and product-specific revenue generated to-date by one or more users of a social media environment, as well as the purchase cycle. As likewise shown in FIG. 4, promotion variables 410 may comprise information generated from interaction with one or more lead signup forms, events or conferences, sales engagements, and so forth. Likewise, firmographics 412 may comprise characteristics (e.g., industry, revenue, number of employees, etc.) of an organization associated with a user of a social media environment. Likewise, site visit indices 404 may comprise indices associated with one or more sites visited by a user of a social media environment. In various embodiments, the site visit indices 404 are generated using visits variables 402, which may include the frequency and recency of visits made by a user of a social media environment, as well as a social content weighting score, which references the relevance of the social content to the visits.

Figure 5:
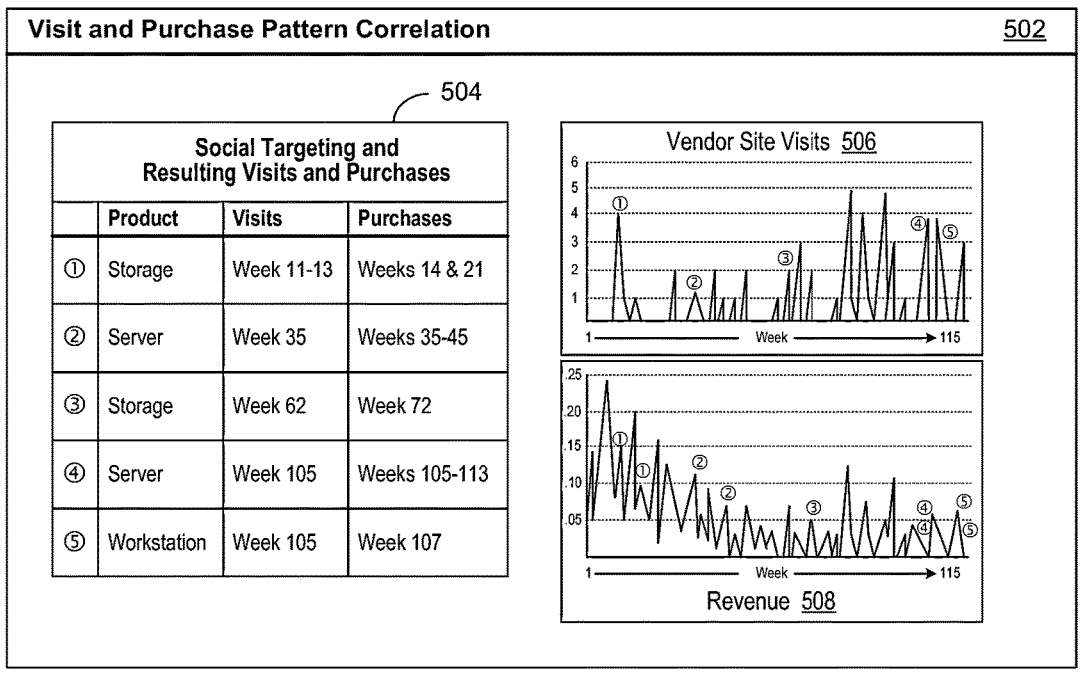
FIG. 5 shows the correlation between advertising, social visit patterns, and purchase patterns for a plurality of companies as displayed within a user interface window.

FIG. 5 shows the correlation between advertising, social visit patterns, and purchase patterns for a plurality of companies as displayed in accordance with an embodiment of the invention within a user interface window. In various embodiments, users of a social media environment are incented to visit a vendor's site through the receipt of targeted social commerce marketing content. The correlation between the receipt of the targeted social media marketing content and resulting visits and purchase patterns can then be determined.

In this embodiment, the correlation is displayed within a "Visit and Purchase Patterns Correlation" 502 user interface (UI) window. As shown in FIG. 5, the "Visit and Purchase Patterns Correlation" 502 UI window comprises a "Social Targeting and Resulting Visits and Purchases" 504 table, which shows the timing correlation between the provision of product-specific social commerce marketing content to targeted social media users and their subsequent vendor site visits and purchases. As likewise shown in FIG. 5, the "Visit and Purchase Patterns Correlation" 502 window also comprises a "Vendor Site Visits" 506 graph, showing site visit traffic, and a "Revenue" 508 graph, which shows the corresponding sales for each product resulting from the visits. In this and other embodiments, the correlation between the provision of social commerce marketing content and the subsequent site visits and purchases are illustrated through the implementation of numeric icons within "Social Targeting and Resulting Visits and Purchases" 504 table, "Vendor Site Visits" 506 graph, and the "Revenue" 508 graph.

Figure 6:
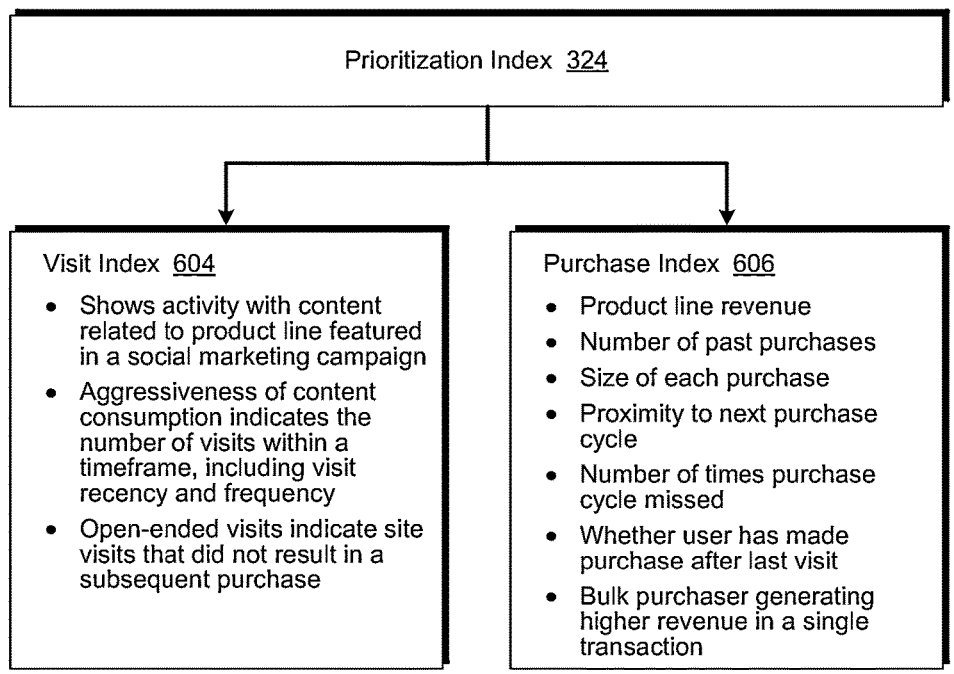
FIG. 6 shows a block diagram of a prioritization index comprising a purchase index and a visit index.

FIG. 6 shows a block diagram of a prioritization index comprising a purchase index and a visit index as implemented in accordance with an embodiment of the invention. In various embodiments, a "Prioritization Index" 602 is generated from a "Visit Index" 604 and a "Purchase Index" 606. In these and other embodiments, the "Visit Index 604 indicates a social media user's activity with content related to a product line featured in a social commerce marketing campaign. The "Visit Index" 604 also indicates the aggressiveness of the consumption of the social commerce marketing content by the user, which in turn indicates the number of site visits made by the user, within a predetermined timeframe, along with the recency and frequency of the visits. Likewise, the "Visit Index" 604 indicates the proportion of open-ended site visits that did not result in a subsequent purchase.

In certain embodiments, the "Visit Index" 504 is determined as follows:

Visit Index=$\Sigma(MV*W_{website})$ where: Momentum of Visit (MV)=$\Sigma$Visits*Recency
where: Visits=Number of Visits
Recency=Recency of the Visit [1/(gap between the visit week and the last week considered in the visit window)]
$W_{WEBSITE}$=Weight for the website
where: $W_A$=1, $W_B$=1, $W_{VENDOR}$=0.5

In various embodiments, the "Purchase Index" 606 indicates the product line revenue, the number of purchases, and the size of each purchase made by the social media user. The "Purchase Index" 606 likewise indicates the proximity to the social media user's next purchase cycle, the number of times that the purchase cycle has been missed, whether a purchase has been made since the last visit, and whether the user is a bulk purchaser.

In certain embodiments, the "Purchase Index" 606 is determined as follows:

$$\text{Purchase Index} = R * PV * SOW$$

where: Magnitude of Vendor Revenue (R)=Revenue generated in the past $$PV = \text{Closeness to realizing a Purchase}$$

$$= \frac{\left(\frac{CW - LPW}{PC}\right) - \text{Integer}\left(\frac{CW - LPW}{PC}\right)}{\text{Integer}\left(\frac{CW - LPW}{PC}\right) + 1}$$

where: CW=Current Week
LPW=Last Purchase Week
PC=Purchase Cycle (average of the differences between consecutive purchases made Last Purchase Week
SOW=Share of Wallet Likewise, the "Prioritization Index" 602 is determined in certain embodiments as follows:

$$\text{Prioritization Index} = (w_1)\text{Visit Index} + (w_2)\text{Purchase Index}$$

where: $w_1=2$ and $w_2=1$

In various embodiments, the foregoing is implemented to determine a vendor's return on investment (ROI) for activities, operations, and processes related to promoting and selling their products or services in social commerce environments.

Figures 7, 8, 9:
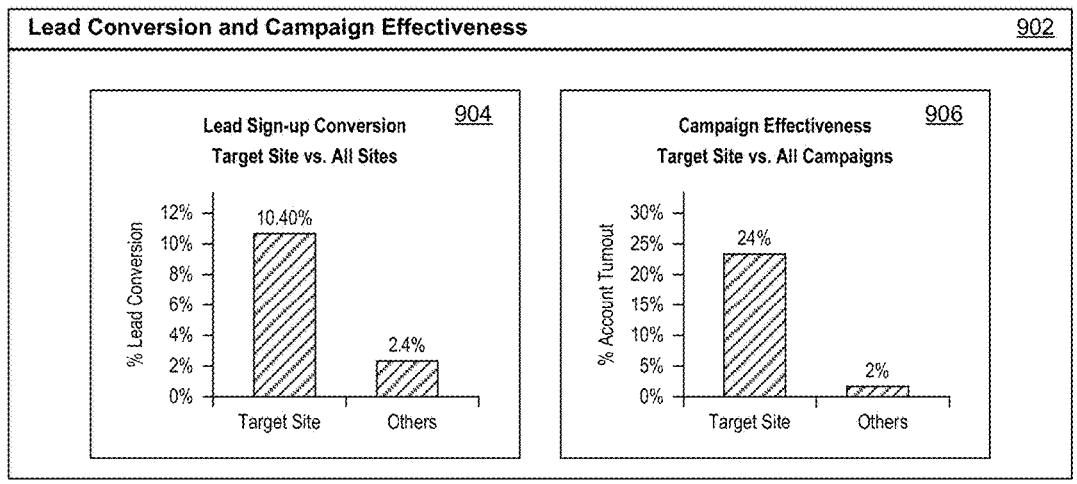
FIG. 7 shows example test results of a social targeting system as displayed within a user interface window.
FIG. 8 shows a user hub of a social targeting lead generation system as implemented within a user interface window.
FIG. 9 shows an example of lead conversion and campaign effectiveness of a social targeting system as displayed within a user interface window.

FIG. 7 shows example test results of a social targeting system as displayed in accordance with an embodiment of the invention within a user interface window. In this embodiment, example test results of a social targeting system are displayed within a "Social Targeting Results" 702 window. As shown in FIG. 7, the "Social Targeting Results" 702 user interface (UI) window comprises a variety of social targeting information, including the number of sales targets to "Follow-up Next Quarter" 706. The "Social Targeting Results" 702 UI window also comprises the number of sales targets that are a "New Opportunity" 708, the number of sales targets that represent an "Opportunity Already Created" 710 and the number of sales targets that are "Unqualified" 718. Likewise, the "Social Targeting Results" 702 window comprises the total number of identified leads 704. As also shown in FIG. 7, the "Social Targeting Results" 702 UI window likewise comprises a variety of information related to the companies 712 associated with the sales targets, including a "Sub-Total" 714 number and the number requiring "Follow-Up" 716. In various embodiments, the aforementioned social targeting is implemented to provide various baseline metrics when determining a vendor's return on investment (ROI) for activities, operations, and processes related to promoting and selling their products or services in social commerce environments.

FIG. 8 shows a user hub of a social targeting lead generation system as implemented in accordance with an embodiment of the invention within a user interface window. In this embodiment, a "Social Lead Generation" 802 user interface window comprises a plurality of drop-down menus 804, 806, 808, 810, 812, 814, 816, which allow a user to select various lead generation parameters. Once the parameter selections are made, the user selects the "Click to Generate Prioritized Lead List" 818 command button through a user gesture, such as a mouse-click with cursor 820, which results in the generation of a prioritized lead list as described in greater detail herein.

FIG. 9 shows an example of lead conversion and campaign effectiveness of a social targeting system as displayed within a user interface window in accordance with an embodiment of the invention. In this embodiment, a "Lead Conversion and Campaign Effectiveness" 902 user interface window comprises "Lead Sign-up Conversion" 904 sub-window and a "Campaign Effectiveness" 906 sub-window. As shown in FIG. 9, the comprises "Lead Sign-up Conversion" 904 sub-window shows the percentage of sales leads conversions at a target site versus other sites, while the "Campaign Effectiveness" 906 sub-window shows the percentage of account turn-out at a target site versus other sites. In various embodiments, the "Lead Sign-up Conversion" 904 sub-window and a "Campaign Effectiveness" 906 sub-window are implemented to display a vendor's return on investment (ROI) for activities, operations, and processes related to promoting and selling their products or services in social commerce environments.

Figure 10:
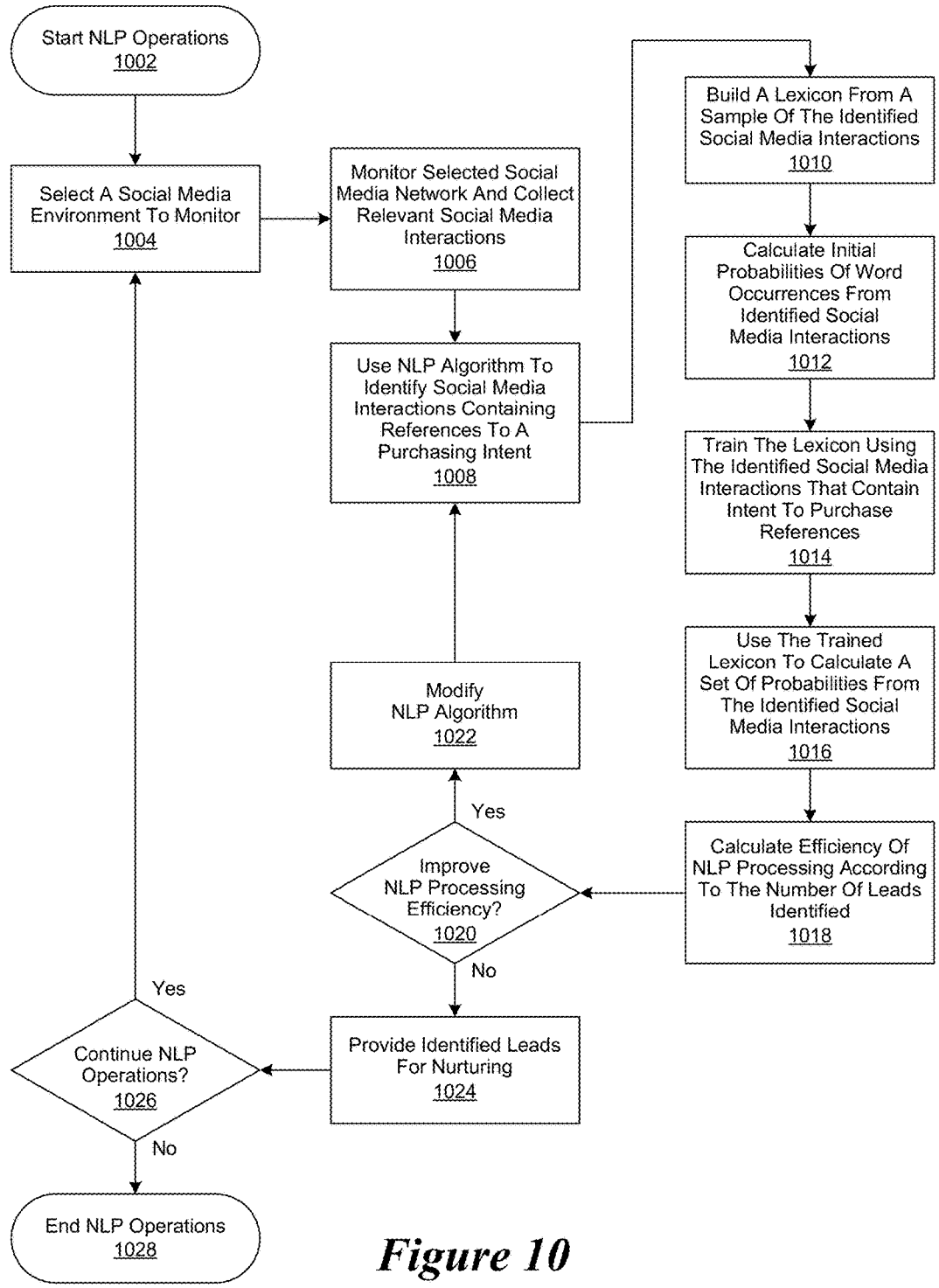
FIG. 10 is a generalized flowchart of the performance of Natural Language Processing (NLP) operations.

FIG. 10 is a generalized flowchart of the performance of Natural Language Processing (NLP) operations as implemented in accordance with an embodiment of the invention. In this embodiment, NLP operations are begun in step 1002. As used herein, NLP refers to the field of computer science, artificial intelligence (AI), and linguistics concerned with the interactions between computers and human (natural) languages. More specifically, it refers to the process of a computing device, or other information handling system, extracting meaningful information from natural language input and then producing natural language output therefrom.

A social media environment is then selected in step 1004 to monitor, followed by the collection in step 1006 of relevant social media interactions performed within the selected social media environment. A NLP algorithm familiar to those of skill in the art is then used in step 1008 to identify social media interactions containing references to a purchasing intent. As an example, a user may post a blog entry stating their intent to purchase a new server and likewise requesting input from subject matter experts to make recommendations on which server they would purchase.

A lexicon is then built in step 1010 from a sample of the identified social media interactions. As used herein, a lexicon refers to a list of words and phrases that can be used in sentences. In various embodiments, each social media interaction is broken down into single, pairs and triads of words and their respective occurrence within the sample of identified social media interactions is counted. In certain embodiments, the lexicon is used in the NLP operations to identify and document lexemes, or word forms, that are used in a social media interaction. In various embodiments, the lexicon is used in the NLP operations to identify and document new and relevant lexemes, or neogolisms, that are used in the social media interactions.

Then, in step 1012, the unigram, bigram and trigram probabilities are calculated based upon these occurrences. Once the probabilities are calculated in step 1012, the lexicon is trained in step 1014, using the identified social media interactions that contain "intent to purchase" references. In various embodiments, the single, pairs and triads word counts are increased 'x' times, based upon the size of the "intent to purchase" dataset. The resulting dataset is then merged with the original lexicon.

In these and other embodiments, the various social media interactions within the selected social media network are filtered to identify those interactions pertaining to the vendor or to the vendor's products and services. The remaining social media interactions are then further filtered to remove spam (e.g., non-vendor-related advertisements, emails, etc.). Once filtered, the social media interactions are then categorized and their respective sentiment is assessed using NLP processes familiar to those of skill in the art. As used herein, sentiment refers to the positive, neutral or negative tone of a portion of text. In one embodiment, sentiment assessment operations are performed to calculate a Social Net Advocacy Pulse (SNAP) metric, which is a measure of the sentiment and advocacy for each dimension of the vendor's business, based upon the underlying social media interactions.

In one embodiment, the social media interaction comprises a Twitter® message or Tweet, which in turn comprises one or more neogolisms. In this and other embodiments, the tweet comprises a sequence of words:

$Tweet_1 = w_1\ w_2\ w_3\ w_4\ w_5\ \ldots\ w_n$, where $w_1 = word_1$

The trained lexicon is then used in step 1016 to calculate a set of probabilities from the previously identified social media interactions contain references to an intent to purchase. Then, in step 1018, the model's efficiency is calculated as the number of social media interactions it is able to identify as compared to the total number of "intent" social media interactions present in the dataset.

A determination is then made in step 1020 whether to improve the efficiency of the NLP processing. If so, then the NLP algorithm is modified in step 1022 by iterating the value of 'x' is to achieve the most efficient model, and the process is continued, proceeding with step 1008. Otherwise, leads are provided for nurturing in step 1024, followed by a determination in step 1026 whether to continue NLP operations. If so, then the process is continued, proceeding with step 1004. Otherwise NLP processing operations are ended in step 1028.

Figure 11:
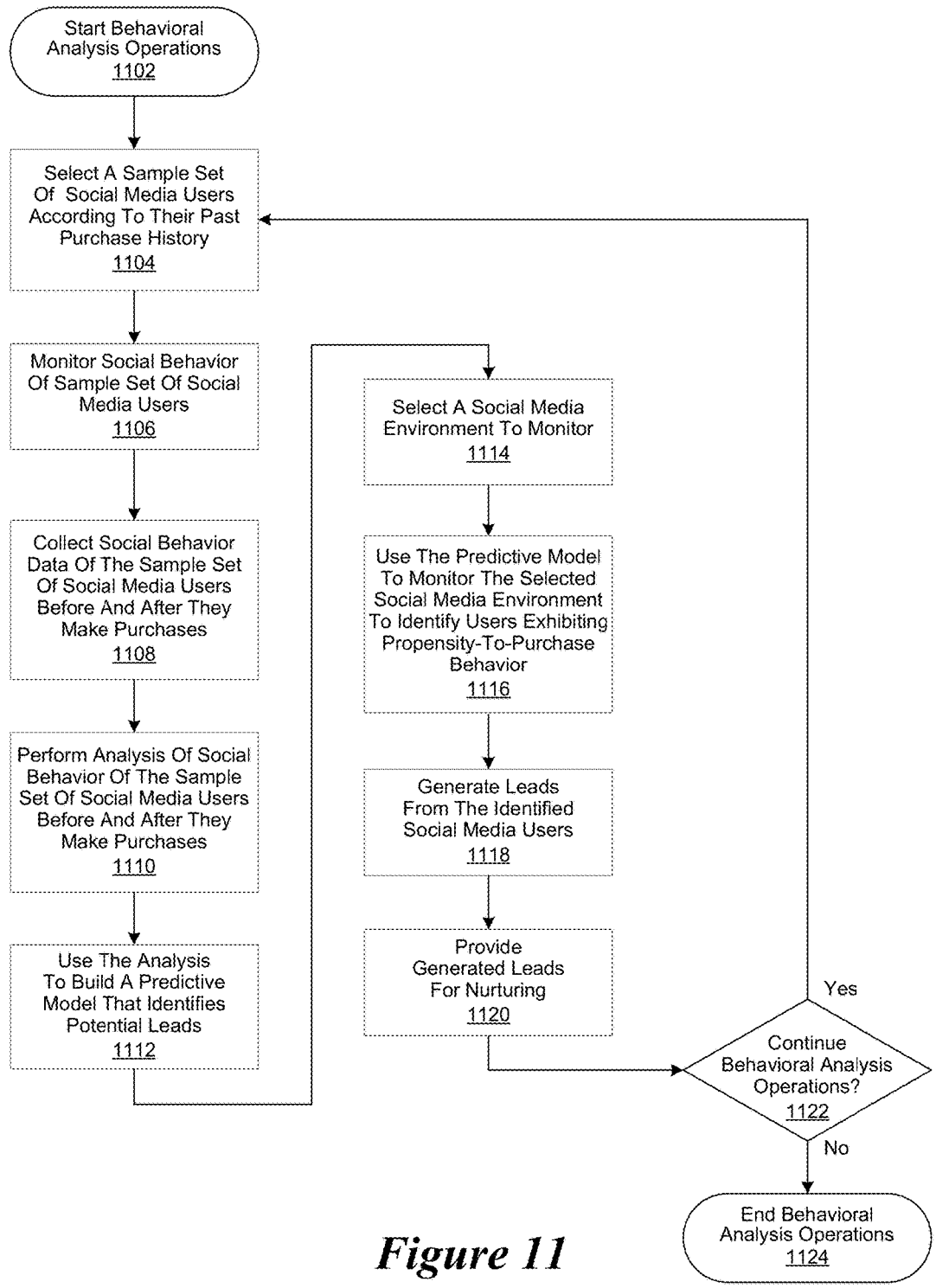
FIG. 11 is a generalized flowchart of the performance of behavioral analysis operations.

FIG. 11 is a generalized flowchart of the performance of behavioral analysis operations as implemented in accordance with an embodiment of the invention. In various embodiments, behavioral analysis operations are performed to identify social media users that have are likely, or have a propensity, to purchase a target product or service. In these and other embodiments, the behavioral analysis comprises observation and analysis of a user's social behavior within a social media environment and their past purchase history. In one embodiment, the behavioral analysis results in the generation of heuristics-based additive model for prioritizing target accounts or sales leads. In this and other embodiments, the heuristics-based additive model results in a Final Index, described in greater detail herein, which in turn comprises a Visit Index and a Purchase Index, likewise described in greater detail herein. In these various embodiments, the higher the Final Index score, the higher the likelihood of a target prospect making a purchase. In one embodiment, the sales leads are processed to identify net new sales leads. In another embodiment, the sales leads are processed to identify current sales leads for various products are services, which are in turn ranked accordingly.

In this embodiment, behavioral analysis operations are begun in step 1102, followed by the selection in step 1104 of a sample set of social media users according to their past purchase history. The social behavior of the sample set of social media users is then monitored in step 1106, followed by collecting the social behavior of the sample set of social media users in step 1108 before and after they make purchases. An analysis of the collected social behavior is then performed in step 1110, followed by using the analysis in step 1112 to build a predictive model that identifies potential sales leads.

A target social media environment is then selected in step 1114, followed by using the predictive model in step 1116 to monitor the selected social media environment to identify social media users exhibiting propensity-to-purchase behavior. Sales leads are then generated from the identified social media users in step 1118, followed by providing the leads for nurturing in step 1120. A determination is then made in step 1122 whether to continue behavioral analysis operations. If so, then the process is continued, proceeding with step 1104. Otherwise behavioral analysis operations are ended in step 1124.

Figure 12:
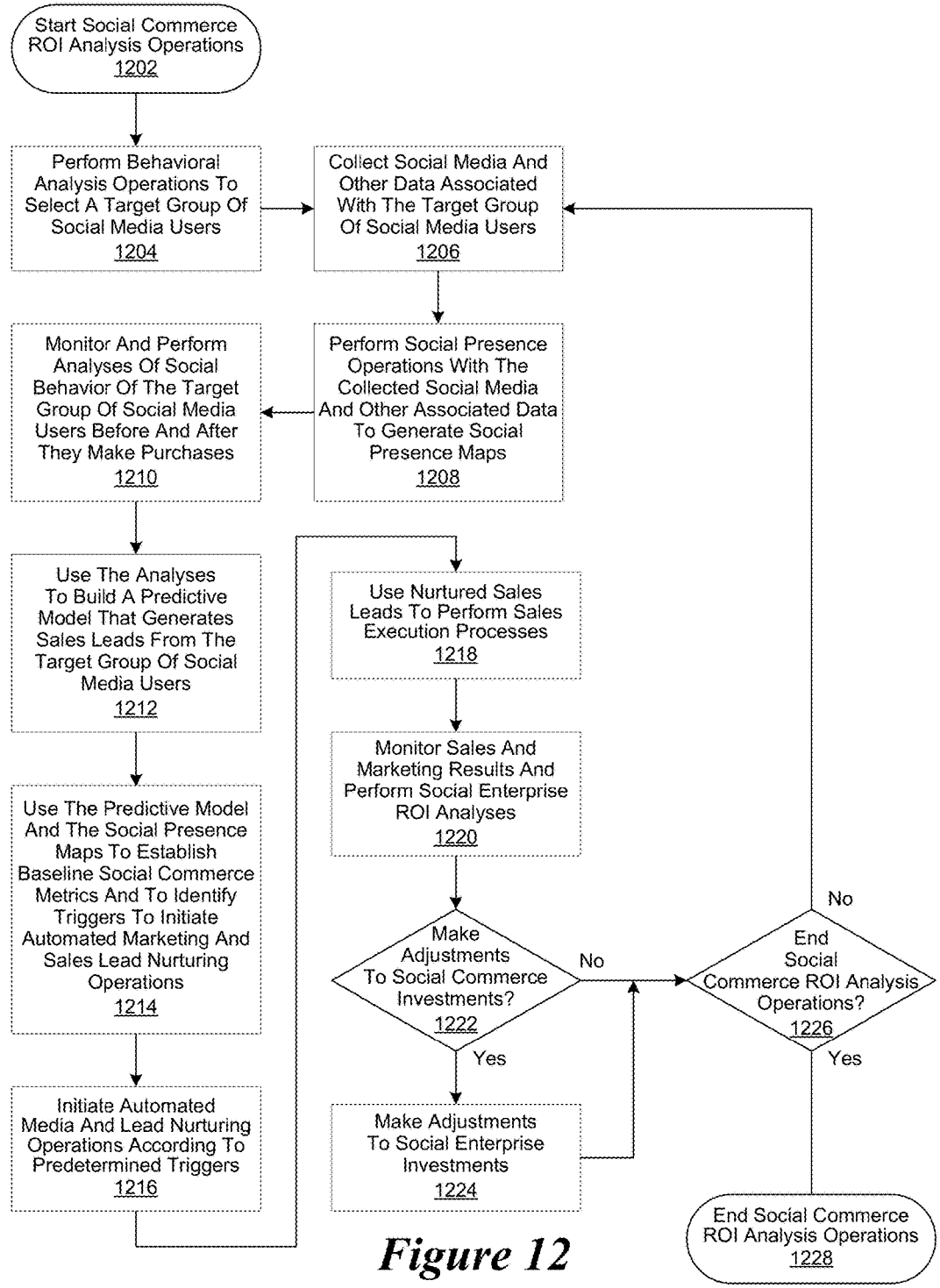
FIG. 12 is a generalized flowchart of the performance of social commerce ROI operations.

FIG. 12 is a generalized flowchart of the performance of social commerce return on investment (ROI) operations as implemented in accordance with an embodiment of the invention. In this embodiment, social commerce ROI analysis operations are begun in step 1202, followed by the performance of behavioral analysis operations in step 1204 to select a target group of social media users. Social media and other data associated with the target group of social media users is then collected in step 1206, followed by the performance of social presence operations described in greater detail herein to generate social presence maps from the collected data in step 1208. Then, in step 1210, the social behavior of the target group of social media users before and after they make purchases is monitored and analyzed. In turn, the resulting analyses are used to build a predictive model in step 1212 that generates sales leads from the target group of social media users.

The resulting predictive model and the previously-generated social presence maps are then used in step 1214 to determine current social commerce metrics and to identify triggers to initiate automated marketing and sales lead nurturing operations. Then, in step 1216, the resulting automated marketing and sales lead nurturing operations are initiated according to the predetermined triggers. The nurtured sales leads are then used in step 1218 to perform sales execution processes familiar to those of skill in the art, followed by monitoring the sales and marketing results and performing social commerce ROI analyses in step 1220. Based upon the analyses, a determination is then made in step 1222 whether to adjust investments in social commerce activities, operations, and processes. If so, then they are adjusted in step 1224. Otherwise, or once the investments have been adjusted in step 1224, a determination is made in step 1226 to end social commerce ROI analysis operations. If not, then the process is continued, proceeding with step 1206. Otherwise, social commerce ROI analysis operations are ended in step 1228.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implemented method for analyzing return on investment for social commerce interactions, comprising:
   processing a set of user data associated with a set of social media users to generate a first set of social commerce metrics, the set of user data comprising a first set of social media interaction data corresponding to a first set of social commerce interactions with the set of social media users;
   processing the set of user data and the first set of social media interaction data to generate a second set of social commerce interactions;
   performing the second set of social commerce interactions with the set of social media users to generate a second set of social commerce interaction data;
   processing the second set of social commerce interaction data to generate a second set of social commerce metrics; and
   processing the first and second sets of social commerce metrics to generate a set of return on investment metrics corresponding to the second set of social commerce interactions; and wherein
   the set of user data is processed to generate a social presence map and a prioritization index, the prioritization index comprising a purchase index and a visit index, the purchase index indicating product line revenue, number of purchases and a size of each purchase by a social media user, the visit index indicating activity with content related to a product line of the social media user;
   the first set of social media interaction data is processed to generate a predictive model;
   the social presence map and the predictive model are processed to generate the first set of social commerce metrics; and,
   the prioritization index is processed when generating the second set of social commerce interactions.

2. The method of claim 1, wherein the second set of social commerce interactions comprises:
   automated marketing operations;
   sales lead nurturing operations; and
   sales execution processes.

3. The method of claim 1, wherein the social presence map and the predictive model are further processed to identify triggers to initiate the second set of social commerce interactions.

4. The method of claim 1, wherein the predictive model is used to generate the sales leads.

5. The method of claim 1, wherein the set of user data comprises:
   a set of active listening data;
   a set of received media data;
   a set of marketing and sales history data;
   a set of social network behavior data;
   a set of firmographic data;
   a set of purchase history data; and
   a set of vendor site visit footprint data.

6. The method of claim 1, wherein:
   the purchase index is calculated as:

Purchase Index=$R*PV*SOW$ where: R=Revenue generated in the past, PV=closeness to realizing a purchase and SOW=Share of Wallet.

7. The method of claim 6, wherein:
   the closeness to realizing a purchase is calculated as:

$$PV = \frac{\left(\frac{CW-LPW}{PC}\right) - \text{Integer}\left(\frac{CW-LPW}{PC}\right)}{\text{Interger}\left(\frac{CW-LPW}{PC}\right)+1}$$

where: CW=Current Week
   LPW=Last Purchase Week
   PC=Purchase Cycle (average of the differences between consecutive purchases madeLast Purchase Week).

8. The method of claim 1, wherein:
   the visit index is calculated as:

Visit Index=$\Sigma(MV*W_{website})$ where: MW=momentum of visit and Wwebsite=Weight of website.

9. The method of claim 8, wherein:
   the momentum of visit is calculated as:

Momentum of Visit (MV)=$\Sigma Visits*Recency$ where: Visits=Number of Visits
   Recency=Recency of the Visit [1/(gap between the visit week and the last week considered in the visit window)] and,
   the weight of the website is calculated as:
   i. $W_A=1$, $W_B=1$, $W_{VENDOR}=0.5$.

10. A system comprising:
    a processor;
    a data bus coupled to the processor; and
    a computer-usable medium embodying computer program code, the computer-usable medium being coupled to the data bus, the computer program code interacting with a plurality of computer operations and comprising instructions executable by the processor and configured for:
       processing a set of user data associated with a set of social media users to generate a first set of social commerce metrics, the set of user data comprising a first set of social media interaction data corresponding to a first set of social commerce interactions with the set of social media users;
       processing the set of user data and the first set of social media interaction data to generate a second set of social commerce interactions;

performing the second set of social commerce interactions with the set of social media users to generate a second set of social commerce interaction data;

processing the second set of social commerce interaction data to generate a second set of social commerce metrics; and processing the first and second sets of social commerce metrics to generate a set of return on investment metrics corresponding to the second set of social commerce interactions; and wherein the set of user data is processed to generate a social presence map and a prioritization index, the prioritization index comprising a purchase index and a visit index, the purchase index indicating product line revenue, number of purchases and a size of each purchase by a social media user, the visit index indicating activity with content related to a product line of the social media user;

the first set of social media interaction data is processed to generate a predictive model;

the social presence map and the predictive model are processed to generate the first set of social commerce metrics; and, the prioritization index is processed when generating the second set of social commerce interactions.

11. The system of claim 10, wherein the second set of social media interactions comprises:
   automated marketing operations;
   sales lead nurturing operations; and
   sales execution processes.

12. The system of claim 10, wherein the social presence map and the predictive model are further processed to identify triggers to initiate the second set of social commerce interactions.

13. The system of claim 10, wherein the predictive model is used to generate the sales leads.

14. The system of claim 10, wherein the set of user data comprises:
   a set of active listening data;
   a set of received media data;
   a set of marketing and sales history data;
   a set of social network behavior data;
   a set of firmographic data;
   a set of purchase history data; and
   a set of vendor site visit footprint data.

15. A non-transitory computer-usable medium embodying computer program code, the computer program code comprising computer executable instructions configured for:
   processing a set of user data associated with a set of social media users to generate a first set of social commerce metrics, the set of user data comprising a first set of social media interaction data corresponding to a first set of social commerce interactions with the set of social media users;

processing the set of user data and the first set of social media interaction data to generate a second set of social commerce interactions;

performing the second set of social commerce interactions with the set of social media users to generate a second set of social commerce interaction data;

processing the second set of social commerce interaction data to generate a second set of social commerce metrics; and processing the first and second sets of social commerce metrics to generate a set of return on investment metrics corresponding to the second set of social commerce interactions; and wherein the set of user data is processed to generate a social presence map and a prioritization index, the prioritization index comprising a purchase index and a visit index, the purchase index indicating product line revenue, number of purchases and a size of each purchase by a social media user, the visit index indicating activity with content related to a product line of the social media user;

the first set of social media interaction data is processed to generate a predictive model;

the social presence map and the predictive model are processed to generate the first set of social commerce metrics; and, the prioritization index is processed when generating the second set of social commerce interactions.

16. The non-transitory computer usable medium of claim 15, wherein the second set of social media interactions comprises:
   automated marketing operations;
   sales lead nurturing operations; and
   sales execution processes.

17. The non-transitory computer usable medium of claim 15, wherein the social presence map and the predictive model are further processed to identify triggers to initiate the second set of social commerce interactions.

18. The non-transitory computer usable medium of claim 15, wherein the predictive model is used to generate the sales leads.

19. The non-transitory computer usable medium of claim 15, wherein the set of user data comprises:
   a set of active listening data;
   a set of received media data;
   a set of marketing and sales history data;
   a set of social network behavior data;
   a set of firmographic data;
   a set of purchase history data; and
   a set of vendor site visit footprint data.

* * * * *